United States Patent [19]

Kuwabara et al.

[11] Patent Number: 5,284,431
[45] Date of Patent: Feb. 8, 1994

[54] FILLING APPARATUS FOR FILLING FOAMED PARTICLES OF A THERMOPLASTIC RESIN INTO A MOLD

[75] Inventors: Hideki Kuwabara; Hidehiro Sasaki; Satoru Shioya, all of Utsunomiya, Japan

[73] Assignee: JSP Corporation, Tokyo, Japan

[21] Appl. No.: 861,906

[22] Filed: Apr. 1, 1992

Related U.S. Application Data

[62] Division of Ser. No. 750,636, Aug. 27, 1991.

[30] Foreign Application Priority Data

Aug. 28, 1990 [JP] Japan ................................. 2-225533
Sep. 28, 1990 [JP] Japan ................................. 2-259574

[51] Int. Cl.$^5$ .............................................. B29C 31/02
[52] U.S. Cl. ................................. 425/148; 425/257; 425/447; 425/449; 425/817 R
[58] Field of Search ............... 425/4 R, 140, 145, 147, 425/148, 817 R, 256, 257, 447, 449

[56] References Cited

U.S. PATENT DOCUMENTS

| | | | |
|---|---|---|---|
| 2,320,594 | 6/1943 | Hempel | 425/148 |
| 3,166,814 | 1/1965 | O'Donnell et al. | 425/148 |
| 3,499,069 | 3/1970 | Seigle | 425/148 |
| 4,557,881 | 12/1985 | Rabotski | 425/4 R |
| 4,818,451 | 4/1989 | Arai et al. | 425/145 |
| 4,880,372 | 11/1989 | Keida | 425/148 |
| 5,074,774 | 12/1991 | Nose et al. | 425/148 |
| 5,110,521 | 5/1992 | Moller | 425/148 |

Primary Examiner—Jay H. Woo
Assistant Examiner—James P. Mackey
Attorney, Agent, or Firm—Sherman and Shalloway

[57] ABSTRACT

A filling apparatus for filling foamed particles of a thermoplastic resin into a mold. The apparatus includes a weigh hopper equipped with a weighing means, a foamed particle feeder adapted to control the amount of the foamed particles of the thermoplastic resin to be fed to the weigh hopper according to the weight of the foamed particles contained in the weigh hopper, a particle feed hopper adapted to temporarily keep a fixed weight of the foamed particles, which have been weighed in the weigh hopper, a holding hopper which acts as a pressurized tank, and a filling machine for filling the foamed particles into a mold. The filling apparatus allows for the successive weighing and pressurized containment of the foamed particles prior to being fed into the mold cavities.

5 Claims, 1 Drawing Sheet

FILLING APPARATUS FOR FILLING FOAMED PARTICLES OF A THERMOPLASTIC RESIN INTO A MOLD

This is a division of application Ser. No. 07/750,636 filed Aug. 27, 1991.

BACKGROUND OF THE INVENTION

1) Field of the Invention

The present invention relates to a production method of an expansion-molded article and a filling apparatus of foamed particles of a thermoplastic resin for use in such a method.

2) Description of the Related Art

Foams of thermoplastic resins have characteristics and properties such that they are light-weight and excellent in thermal insulating property and cushioning property. Therefore, the foams are widely used in various shapes or forms in thermal insulating materials, cushioning materials, packaging materials, etc. As a method of producing such foams, there has been widely known the foamed-in-place molding in which a thermoplastic resin is first of all impregnated with a blowing agent, the thermoplastic resin is expanded to produce foamed particles, and the foamed particles are then filled into a mold and heated with steam or the like, thereby expansion-molding them.

At the early time the foamed-in-place molding started to be used in industry, the foamed particles were fed under pressure by compressed air or the like to fill them in an amount as full as possible into the mold, thereby molding them. According to this method, the constant volume of molded articles can be obtained. However, such a method involved a drawback that the constant weight of molded articles can not be obtained because scattering of amounts of the foamed particles to be filled into the mold becomes extremely great due to scattering of pressures upon filling under pressure, densities and particle sizes of the foamed particles, etc. As described in Japanese Patent Application Laid-Open No. 27117/1987, it has accordingly been used to measure the volume of foamed particles by means of a metering device so as to always fill a fixed volume of the foamed particles into a mold.

According to the method wherein the volume of the foamed particles is measured to fill them, the constant volume of the foamed particles is always filled into the mold. It is therefore possible to provide the constant weight of molded articles so long as the foamed particles always have a fixed expansion ratio (density). Even if expansion of the thermoplastic resin particles are conducted under as much control as possible in the production process of the foamed particles, it is however difficult to entirely do away with the scattering of expansion ratios of the resultant foamed particles. In the method wherein the fixed volume of the foamed particles are always filled into the mold to mold them, the resultant expansion-molded articles therefore vary in density and weight due to scattering of the expansion ratios of the foamed particles. In conclusion, the method wherein the volume of the foamed particles to be filled is kept constant could not furnish a solution for the provision of always the constant weight of molded articles. With the manufacture of a variety of precise industrial products, there has been a demand for making the weight of every products uniform in recent years in particular (for example, core materials for automobile bumpers). The conventional method could not meet such a demand.

SUMMARY OF THE INVENTION

With the foregoing in view, the present invention has as an object the provision of a production method of an expansion-molded article, by which the demanded constant weight and volume of molded articles can be provided even if foamed particles somewhat scatter in expansion ratio, and a filling apparatus of foamed particles of a thermoplastic resin for use in such a method.

In one aspect of this invention, there is thus provided a method of producing an expansion-molded article by filling foamed particles of a thermoplastic resin into a mold and then causing the foamed particles to expand and fusion-bond under heat, which comprises measuring the weight of the foamed particles to be filled to fill a fixed weight of the foamed particles into the mold, thereby expansion-molding them.

In another aspect of this invention, there is provided a filling apparatus of foamed particles of a thermoplastic resin, comprising a weigh hopper equipped with a weighing means; a foamed particle feeder adapted to control the amount of the foamed particles of the thermoplastic resin to be fed to the weigh hopper according to the weight of the foamed particles contained in the weigh hopper; a particle feed hopper adapted to temporarily keep a fixed weight of the foamed particles, which have been weighed in the weigh hopper, and then to transfer them; and a filling machine for filling the foamed particles into a mold.

BRIEF DESCRIPTION OF THE DRAWINGS

The above and other objects, features and advantages of the present invention will becomes apparent from the following description of the invention and the appended claims, taken in conjunction with the accompanying drawings, illustrating one embodiment of the present invention, in which:

DETAILED DESCRIPTION OF THE INVENTION AND PREFERRED EMBODIMENTS

Figure 1:
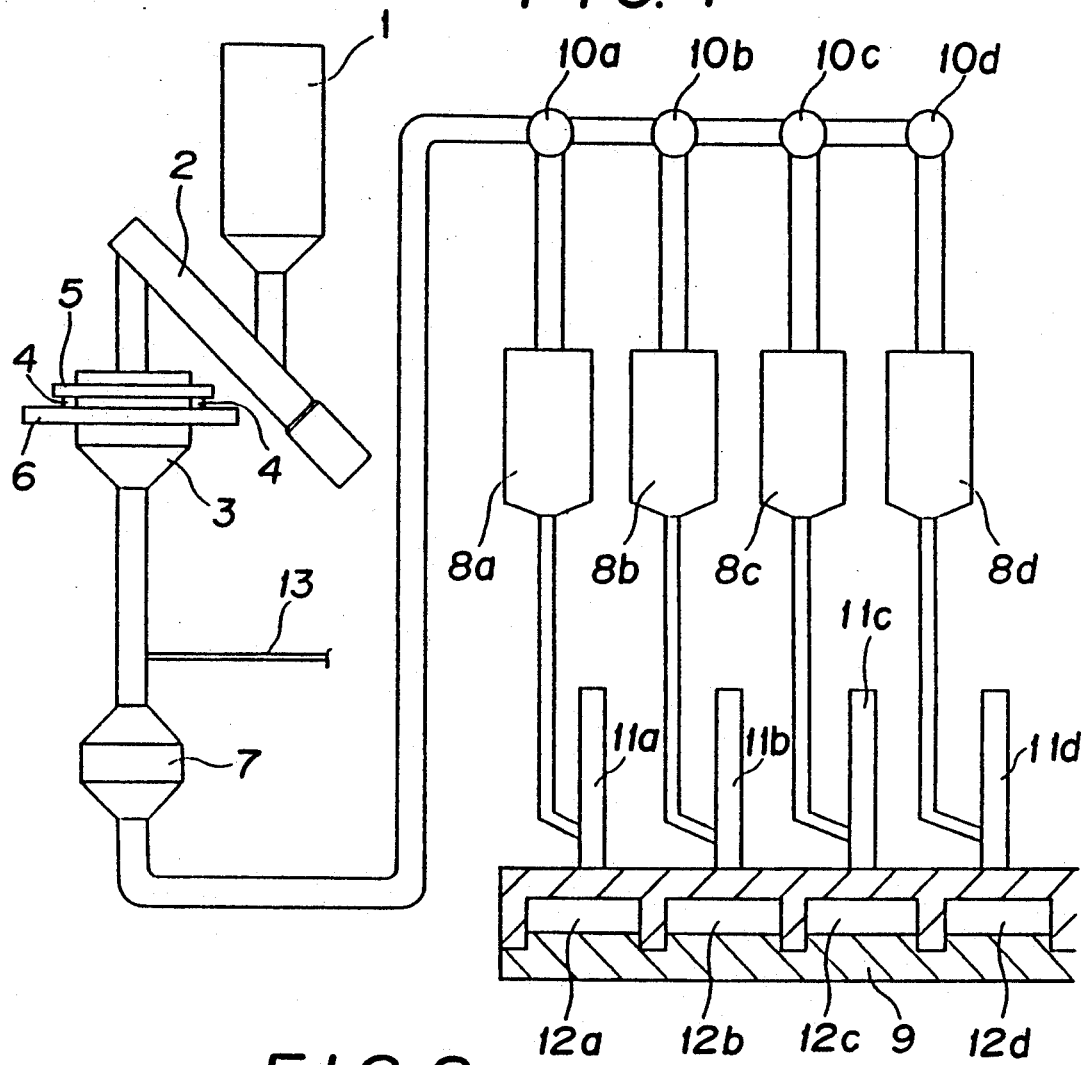
FIG. 1 is a schematic illustration of an apparatus according to one embodiment of this invention.

As exemplary base resins for the foamed particles of the thermoplastic resin useful in the practice of this invention, may be mentioned polyolefin resins such as low-density polyethylene, linear low-density polyethylene, high-density polyethylene, polypropylene, ethylene-propylene random copolymers, ethylene-propylene block copolymers, and mixtures of two or more these resins; styrene resins such as polystyrene, poly-p-methylstyrene, styrene-maleic anhydride copolymers, styrene-acrylonitrile copolymers, styrene-butadiene-acrylonitrile copolymers; polyvinyl chloride; vinyl chloride-vinyl acetate copolymers; polyvinylidene chloride; and the like.

The foamed particles used in this invention can be obtained in accordance with a method in which resin particles containing a blowing agent therein are expanded under pressure in a pressure vessel, a method wherein a resin and a blowing agent are melted and kneaded in an extruder, the resultant melt is extruded and expanded in the form of a strand and the strand is then chopped into foamed particles, a method wherein resin particles and a blowing agent are dispersed in a dispersion medium in a pressure vessel, the resultant dispersion is heated under pressure to impregnate the resin particles with the blowing agent and the dispersion is then released under atmospheric pressure to expand the particles, or the like.

Although the foamed particles obtained in the above-described manner are left to stand under atmospheric pressure after the expansion to age them, they may be treated under pressure with, in general, an inorganic gas, preferably, an inorganic gas containing nitrogen in a greater amount such as nitrogen gas or air to incorporate the inorganic gas in the particles, thereby applying an internal pressure (in general, a pressure higher than 0.2 kg/cm$^2$·G in terms of gauge pressure) to the foamed particles prior to their molding in a pressurizing tank.

The foamed particles optionally applied with the internal pressure are weighed so as to fill them in a fixed weight into a mold. The weight of the foamed particles to be filled into the mold is preset from the internal volume of a mold to be used and the density of the foamed particles according to the desired density of an intended molded article. If foamed particles of, for example, an ethylene-propylene random copolymer, which have an internal pressure of about 0 kg/cm$^2$·G, are weighed and filled into a mold having an internal volume of $15 \times 10^3$ cm$^3$ to attempt to obtain an intended molded article having a volume, $V_2$ of $(15 \times 10^3) \times 0.985^3$ supposing the shrinking of the molded article is 1.5%, and a desired density of 0.06 g/cm$^3$, the weight of the foamed particles to be filled into the mold is preset to $(15 \times 10^3) \times 0.985^3 \times 0.06 = 860$ g. The weight of the foamed particles to be fill is preset in the above-described manner, and they are always filled in the thus-preset weight into the mold.

The foamed particle are weighed to fill them into the mold in such a manner. When an intended molded article having a volume, $V_2$ of $(15 \times 10^3) \times 0.985^3$ and a density of 0.06 g/cm$^3$ is now attempted to obtain, the weight of the foamed particles is preset to 860 g as described above. At this time, supposing the bulk volume of the foamed particles to be filled before filling and the volume of the intended molded article are $V_1$ and $V_2$, respectively, the foamed particle may be filled into the mold by the conventional filling method such as a cracking filling method, in which the mold is not completely closed to make the internal volume of the cavity greater by a certain volume (this increased volume is called cracking), the foamed particles are fully filled into the mold by a pneumatic conveying means making use of a gas of 1–3 kg/cm$^2$·G without substantially compressing the foamed particles, and the mold is then completely closed, when the $V_1/V_2$ value is 1.50 or lower. When the $V_1/V_2$ value exceeds 1.50, it is difficult to fill them by the cracking filling method. In such a case, it is preferable to use a special filling method as described in Japanese Patent Application Laid-Open No. 212131/1987, in which foamed particles are filled into a mold, which has been pressurized in advance, using a pressurized gas in a pressurizing tank. Such a method involves a potential problem connecting with increased cost because of, for example, use of particular equipments. On the other hand, when foamed particles are compressed and filled into a mold by pressurized gas (2–5 kg/cm$^2$·G), but a mold is not pressurized, whereby the foamed particles are fully filled in the mold in a state that the foamed particles have been compressed (hereinafter referred to as pressurizing filling method), they take the form of forced filling if the $V_1/V_2$ value is higher than 1.50, so that there is a potential problem that scattering of sectional densities of the resultant molded article occurs.

Secondly, from the viewpoint of the secondary expandability, when the $V_1/V_2$ value is at least 0.94, it is possible to obtain a sufficiently good molded article without applying any internal pressure to the foamed particles in a pressurizing tank (internal pressure of the particles: about 0 kg/cm$^2$·G). On the other hand, when the $V_1/V_2$ value is at least 0.80 but lower than 0.94, and exceeds the limit of the secondarily expanding ability of the foamed particle to be filled, there is a potential problem that a molded article conforming with a mold can not be obtained due to insufficient secondary expansion such as failure of fusion-bonding and occurrence of interstices even if the filling weight is correct. It is hence preferable to use, for example, a method in which the internal pressure of the foamed particles is made higher than 0 kg/cm$^2$·G (usually, 0.2–2.0 kg/cm$^2$·G) in order to secure the secondary expanding ability of the foamed particles to a sufficient extent in a pressurizing tank. Further, when the $V_1/V_2$ value is lower than 0.80, it is necessary to use special foamed particles obtained by applying an internal pressure to foamed particles to a considerably great extent, thereby highly increasing their expanding ability. The use of such foamed particles connects with increased cost and moreover, involves a potential problem that scattering of sectional densities of the resultant molded article occurs.

From the reasons described above, when molded articles are attempted to obtain by using the conventional apparatus and heating foamed particles with steam of a usual pressure of 2.0–4.5 kg/cm$^2$·G to mold them, it is possible to always obtain good-quality molded articles having a fixed weight and a fixed density if a fixed weight of the foamed particles are always filled into a mold and a packing rate is $0.8 \leq V_1/V_2 \leq 1.50$.

By the way, when foamed particles applied with an internal pressure are weighed and filled, it is necessary to add the weight of the gas contained in the particles, $\omega$, which is found from the relationship of the equation of state of gas: $PV = (\omega/M)RT$, to the weight preset.

One embodiment of the present invention will hereinafter be described with reference to the accompanying drawings.

FIG. 1 illustrates a filling apparatus according to one embodiment of the present invention In FIG. 1, numeral 1 indicates a raw material hopper. Foamed particles of a thermoplastic resin in the raw material hopper 1 are transferred to a weigh hopper 3 by a foamed particle feeder 2. The foamed particle feeder 2 is constructed so as to be capable of controlling the amount of the foamed particles of the thermoplastic resin to be fed to the weigh hopper 3 according to the weight of the foamed particles present in the weigh hopper 3. The control of the amount of the foamed particles to be fed to the weigh hopper 3 can be conducted, for example, in the following manner. The foamed particle feeder 2 is made up so as to make it possible to preset the feeding speed to several stages, whereby the feeding speed of the foamed particles is reduced by stages as the weight of the foamed particles fed to the weigh hopper 3 comes near the intended weight. Alternatively, the foamed particle feeder 2 is made up so as to make it possible to preset the feeding speed steplessly, whereby the feeding speed of the foamed particles is reduced continuously as the weight of the foamed particles fed to the weigh hopper 3 is increased. Any feeders may be used as the foamed particle feeder 2 so long as they permit the control of the feeding speed. As examples of such a feeder, may be mentioned a belt feeder, helical screw feeder, table feeder, rotary feeder, injection feeder, etc. These feeders may be used in combination with each other. The helical screw feeder is particularly preferred.

Figure 2:
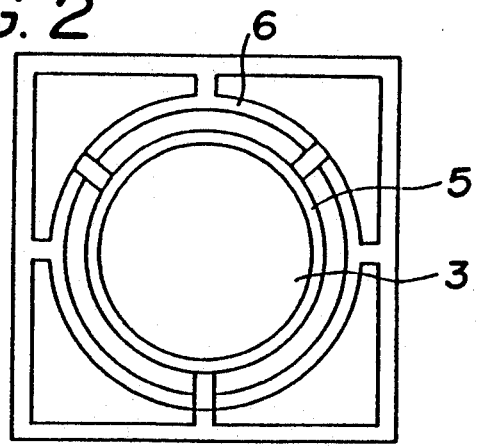
FIG. 2 is a schematic plan view of a weigh hopper as a part of the apparatus.

The weigh hopper 3 is provided with load cells 4 as a weighing means. The load cells 4 are attached, for example, by providing a collar 5 around the weigh hopper 3 and joining the load cells to and between this collar 5 and a hopper supporting frame 6 as illustrated in FIG. 2. In this invention, the foamed particles are weighed together with the weigh hopper 3 of a heavy weight. It is therefore preferable to provide a plurality of load cells. The provision of the plural load cells make it possible to decrease a load applied to each load cell. It is hence possible to measure the weight of the foamed particles light as compared with the weigh hopper 3 with precision. The number of load cells varies with the weight of the weigh hopper 3, the weight of the foamed particles to be weighed, the required accuracy in weighing, etc. It is however preferable to provide 2-5 load cells in general. As the weighing means, may be used, in addition to the load cell, any kinds of means, such as a direct-reading balance and spring balance so far as their accuracy in weighing allows.

A fixed weight of the foamed particles weighed in the weigh hopper 3 are then fed to a particle feed hopper 7. At this time, whether the foamed particles remain in the weigh hopper 3 or not is judged by the load cells 4 as the weighing means. If the foamed particles in the weigh hopper 3 are not fully fed to the particle feed hopper 7, but remain in the weigh hopper 3 (in particular, when the foamed particles are charged with static electricity, they tend to remain in the weigh hopper 3), it is necessary to completely transfer the foamed particles in the weigh hopper 3 to the particle feed hopper 7 by taking a measure such as air blowing (preferably, blowing of air electrified with both plus and minus charges).

The foamed particles are once held in the particle feed hopper 7 and then fed therefrom to holding hoppers 8a-8d, for example, by compressed air supplied through a compressed-air supply pipe 13. In FIG. 1, an example making use of a multi-cavity mold 9 is illustrated. The fixed weight of the foamed particles, which have been weighed in the weigh hopper 3 and transferred to the particle feed hopper 7 to be held therein, are first of all transferred, for example, to the holding hopper 8a. On the other hand, another batch of foamed particles are successively weighed in the weigh hopper 3. The thus-weighed foamed particles are then transferred from the particle feed hopper 7 to the holding hopper 8b. In the similar manner, respective batches of foamed particles are in turn transferred to the holding hoppers 8c and 8d. By the way, the holding hoppers 8a through 8d possess a function as a pressurizing tank. The filling apparatus according to the present invention is constructed in such a manner that a fixed weight of the foamed particles are surely transferred from the particle feed hopper 7 to one of the holding hoppers 8a-8d by switching their destination to be transferred by change-over valves 10a-10d. The foamed particles transferred to the holding hopper 8a-8d are respectively filled into mold cavities 12a-12d of the multi-cavity mold 9 by respective filling machines 11a-11d connected to the holding hopper 8a-8d. In the above-described manner, the fixed weights of the foamed particles are respectively filled into the mold cavities 12a-12d. When a pressurizing and decompressing valve is provided in each of the holding hoppers 8a-8d to permit the increase and decrease of the pressure within each of the holding hoppers 8a-8d, filling process can be conducted speedily, for example, upon the compression of the foamed particles in the holding hopper and filling into the cavity by the pressurizing filling method.

When the multi-cavity mold is used as described above, holding hoppers of the number corresponding to the number of the cavities in the mold are provided to feed the foamed particles from the holding hoppers to their corresponding cavities by respective filling machines. Such a construction can ensure that fixed weights of the foamed particles are fed to a plurality of the filling machines by only one weighing hopper. On the other hand, when a one-cavity mold is used, it is not always necessary to provide the holding hopper.

The foamed particles filled into the mold cavities 12a-12d are heated with the conventionally-known heating means such as steams to mold them.

EXAMPLES

The present invention will hereinafter be described in further detail by the following examples.

EXAMPLES 1-8

Each of foamed particle samples shown in Table 1 was weighed, and the fixed weight of the foamed particle sample thus weighed was filled into a mold having an internal volume of 15 l by the cracking filling method, and heated with steam of its corresponding pressure shown in Table 1. In the above-described manner, each of the foamed particle samples was continuously molded 20 times. The desired weights and densities of intended molded articles, the weights and densities of molded articles practically obtained, and the densities and preset filling weights into the respective molds of the foamed particle samples used in the molding are shown in Table 1 and/or Table 2. Properties of the resulting molded articles are also shown in Table 2.

Incidentally, in Examples 3 and 7, foamed particle samples whose internal pressures were increased to 1 $kg/cm^2 \cdot G$ were used, while in Examples 4 and 8, the foamed particle samples were filled in respective 15 l molds free of any cracking by a pressurizing filling method, thereby molding them.

COMPARATIVE EXAMPLES 1 & 2

Fixed volumes of foamed particle samples shown in Table 1 were separately filled into the same mold as those used in the examples, which had been provided with a cracking of 1 l, using a conventional feeder by cracking filling method, and then heated with steam of their corresponding pressures shown in Table 1, thereby continuously molding them 20 times. The desired weights and densities of intended molded articles, the weights and densities of molded articles practically obtained, and the densities and preset filling volumes into the respective molds of the foamed particle samples used in the molding are shown in Table 1 and/or Table 2. Properties of the resulting molded articles are also shown in Table 2.

TABLE 1

| | Properties of foamed particles used | | Pressure of steam for molding (kg/cm² · G) | Filling amount into mold of foamed particles (preset value) | |
|---|---|---|---|---|---|
| | Kind of base resin | Average bulk density (g/cm³) | | Weight (g) | Volume (l) |
| Ex. 1 | Ethylene-propylene random copolymer | 0.053 | 3.5 | 873 | — |
| Ex. 2 | Ethylene-propylene random copolymer | 0.060 | " | " | — |
| Ex. 3 | Ethylene-propylene random copolymer | 0.068 | " | 883 *3 | — |
| Ex. 4 | Ethylene-propylene random copolymer | 0.043 | " | 873 *4 | — |
| Ex. 5 | Ethylene-propylene random copolymer | 0.041 | " | 675 | — |
| Ex. 6 | Ethylene-propylene random copolymer | 0.047 | " | " | — |
| Ex. 7 | Ethylene-propylene random copolymer | 0.053 | " | 685 *3 | — |
| Ex. 8 | Ethylene-propylene random copolymer | 0.033 | " | 675 *4 | — |
| Comp. Ex. 1 | Ethylene-propylene random copolymer | 0.053 | " | — | 16 |
| Comp. Ex. 2 | Ethylene-propylene random copolymer | 0.041 | " | — | " |

*3: Foamed particles applied with an internal pressure in a pressurizing tank.
*4: Foamed particles were compressed and then filled by the pressurizing filling method.

TABLE 2

| | Intended molded article | | Practically obtained molded article (20 articles) | | $V_1/V_2$ value | Properties of molded articles | |
|---|---|---|---|---|---|---|---|
| | Weight (g) | Density (g/cm³) | Weight (g) | Density (g/cm³) | | Scattering of *1 densities and weights | Fusion bonding *2 property of particles |
| Ex. 1 | 873 | 0.061 | 865–884 | 0.060–0.062 | 1.15 | ○ | ○ |
| Ex. 2 | " | 0.061 | 863–892 | 0.060–0.062 | 1.01 | ○ | ○ |
| Ex. 3 | " | " | 869–894 | 0.060–0.062 | 0.91 | ○ | ○ |
| Ex. 4 | " | " | 870–880 | 0.061 | 1.42 | ○ | ○ |
| Ex. 5 | 675 | 0.047 | 660–689 | 0.046–0.048 | 1.15 | ○ | ○ |
| Ex. 6 | " | " | 660–688 | 0.046–0.048 | 1.00 | ○ | ○ |
| Ex. 7 | " | " | 662–691 | 0.046–0.048 | 0.90 | ○ | ○ |
| Ex. 8 | " | " | 659–685 | 0.046–0.048 | 1.43 | ○ | ○ |
| Comp. Ex. 1 | 873 | 0.061 | 827–915 | 0.058–0.064 | — | x | ○ |
| Comp. Ex. 2 | 675 | 0.047 | 633–710 | 0.044–0.050 | — | x | ○ |

*1: The scattering of densities and weights of 20 molded articles in each example or comparative example was evaluated in accordance with the following standard:

○ . . . Scattering smaller than ±3% as to all molded articles;

△ . . . Scattering in a range of ±3–±5 as to some of the molded articles; and x . . . Scattering greater than ±5 as to some of the molded articles.

*2: The fusion bonding property of each molded article was evaluated in accordance with the following standard:

○ . . . Non-interparticle breakage occurred on more than 80% of the molded article upon its destruction;

△ . . . Non-interparticle breakage occurred on 50–80% of the molded article upon its destruction;

x . . . Non-interparticle breakage occurred on less than 50% of the molded article upon its destruction.

ADVANTAGES OF THE INVENTION

According to the present invention, the following effects have been brought about. Since the weight of foamed particles is measured to always fill a fixed weight of the foamed particles into a mold on the basis of its preset value, thereby molding them, no scattering of volumes and weights of the resultant molded articles occurs even when the foamed particles somewhat scatter in expansion ratio, so that uniform molded articles can always be obtained. Since the foamed particles are also filled within a range of limited packing rates, it is possible to obtain excellent molded articles free of inferior in interparticle fusion bonding. Moreover, when a fixed weight of the foamed particles are filled and molded in such a manner that a $V_1/V_2$ value becomes at least 0.94, it is possible to obtain sufficiently good molded articles without applying an internal pressure to the foamed particles by a pressurizing treatment in a pressurizing tank or the like.

Besides, the filling apparatus according to this invention can always fill a fixed weight of foamed particles into a mold to mold them. Therefore, it is possible to provide the demanded constant weight and volume of molded articles. Even when a multi-cavity mold is used, fixed weights of foamed particles can be always fed to a plurality of cavities by only one weighing device. Furthermore, when holding hoppers of the number corresponding to the number of the cavities are provided between respective filling machines and particle feed hoppers, a fixed weight of the foamed particles can be fed into each of the cavities and moreover, an advantage is brought about, for example, upon compressing the foamed particles to fill them into the mold by the pressurizing filling method. In addition, when a helical screw feeder is used as a foamed particle feeder for feeding foamed particles to a weigh hopper, the fixed-weight feeding can be rapidly performed, and the specification of weighing from a large quantity to a small quantity can be enlarged. When a plurality of load cells are provided as a weighing means by joining them to the weighing hopper, the weight of foamed particles can be measured with high accuracy.

What is claimed is:

1. A filling apparatus for filling foamed particles of a thermoplastic resin into a multi-cavity mold, comprising:
   a weigh hopper adapted to contain a predetermined weight of foamed particles of a thermoplastic resin, said weigh hopper equipped with a weighing means for weighing foamed particles contained within said weigh hopper;
   a foamed particle feeder, operatively connected to said weigh hopper, for feeding said predetermined weight of foamed particles of a thermoplastic resin into said weigh hopper, said foamed particle feeder adapted to control the rate at which foamed particles of the thermoplastic resin are fed to the weigh hopper according to the weight of the foamed particles contained in the weigh hopper;
   a particle feed hopper, operatively connected to said weigh hopper, for receiving and temporarily holding said predetermined weight of the foamed particles which have been weighed in the weigh hopper;
   a plurality of holding hoppers, each holding hopper corresponding to a respective cavity of said multi-cavity mold, for holding said predetermined weight of foamed particles of a thermoplastic resin, each said holding hopper further comprising a pressurizing means for applying gas pressure to particles contained therein;
   transport means, operatively connecting said particle feed hopper and said plurality of holding hoppers, for selectively transferring said predetermined weight of foamed particles of a thermoplastic resin from said particle feed hopper to one of said plurality of holding hoppers; and
   filling machine means for filling a respective cavity of said multi-cavity mold with the foamed particles from the corresponding holding hopper.

2. The filling apparatus as claimed in claim 1, wherein the foamed particle feeder is a helical screw feeder.

3. The filling apparatus as claimed in claim 1, wherein the weighing means comprises a plurality of load cells joined to the weigh hopper.

4. The filling apparatus as claimed in claim 1 wherein said transport means includes change-over valves positioned between the particle feed hopper and each said holding hopper.

5. The filling apparatus as claimed in claim 1 wherein said filling machine means comprises a plurality of filling machines, each filling machine corresponding to a respective cavity of said multi-cavity mold, each filling machine adapted to fill the corresponding mold cavity with the predetermined weight of foamed particles of a thermoplastic resin held in the respective holding hopper for that cavity.

* * * * *